(No Model.)
J. W. GROVES & V. MINICH.
METHOD OF AND MEANS FOR CULTIVATING FRUITS AND VEGETABLES.
No. 297,932. Patented Apr. 29, 1884.
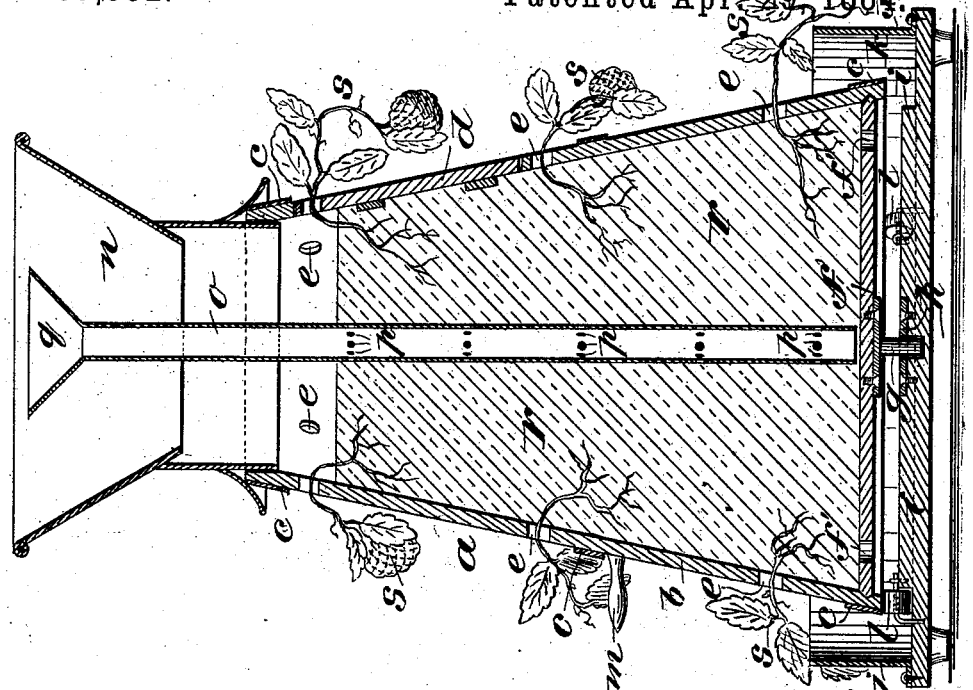
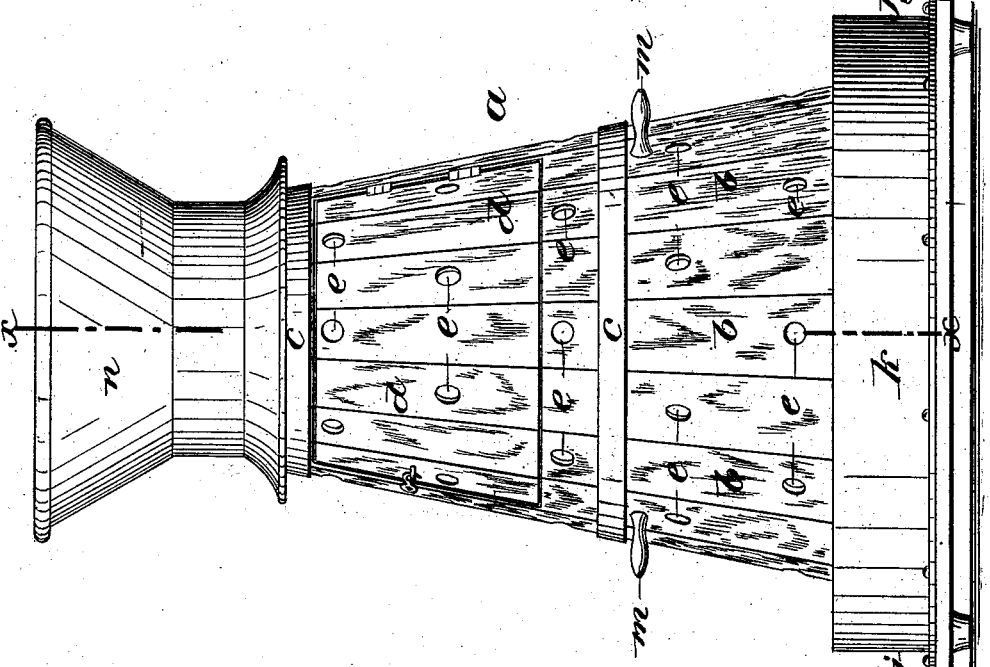
WITNESSES:
Otto Beyer
C. Sedgwick
INVENTOR:
J. W. Groves
V. Minich
BY Munn & Co
ATTORNEYS.

UNITED STATES PATENT OFFICE.

JOHN WILLIAM GROVES AND VALENTINE MINICH, OF SOUTH OIL CITY, PENNSYLVANIA, ASSIGNORS OF ONE-HALF TO MATHEW BLAKELEY CLEMENGER, OF SAME PLACE.

METHOD OF AND MEANS FOR CULTIVATING FRUITS AND VEGETABLES.

SPECIFICATION forming part of Letters Patent No. 297,932, dated April 29, 1884.

Application filed August 20, 1883. (No model.)

*To all whom it may concern:*

Be it known that we, JOHN W. GROVES and VALENTINE MINICH, both of South Oil City, in the county of Venango and State of Pennsylvania, have invented a new and Improved Method of and Means for Cultivating Fruits and Vegetables, of which the following is a full, clear, and exact description.

Our invention relates to a new method of and means for promoting the thrifty growth of fruits and vegetables, the special objects being to afford by our improvements, first, opportunity for the culture of fruits and vegetables on a practical scale, independently of planting them in the earth or ground, so that they may be raised indoors or upon any convenient outdoor shelf or other support, as a veranda or roof; second, to grow the fruits in a manner to keep them free from weeds and sand; third, to provide for the culture of a large crop in a small space; fourth, to maintain an efficient water-supply; and, fifth, to provide for a constant or variable exposure of the plants to the sun, as may be required for an even ripening of the fruits.

The invention consists in a method of growing the fruits through holes in a tank, barrel, or other vessel; also, in growing the fruits through holes in a vessel which gradually enlarges toward its base; also, in the arrangement of such vessel to rotate horizontally; also, in the arrangement of said rotating vessel in a relatively-fixed base or basin utilized as a water receptacle or reservoir; also, in the employment of a centrally-positioned and perforated water-supply tube in the vessel; also, in in a flower crock or vase mounted on the top of the vessel; and, finally, in various novel constructions of the parts of the apparatus and combinations of the parts with each other, all as hereinafter fully described and claimed.

Reference is to be had to the accompanying drawings, forming part of this specification, in which similar letters of reference indicate corresponding parts in both the figures.

Figure 1 is a side elevation of our improved apparatus for the culture of fruits and vegetables in accordance with our invention, and Fig. 2 is a central vertical sectional elevation of the same on the line *x x* of Fig. 1.

In carrying out our improved method of growing fruits or vegetables through holes in a tank, barrel, or other vessel, we may employ a vessel of any preferred suitable material, size, shape, or design, having holes through it, through which holes the growing plants may project.

The drawings represent a preferred construction of apparatus, and in which the letter *a* indicates a vessel in the shape of the frustum of a cone, and in this example the vessel is made of wooden staves *b*, held together by metal bands *c*.

The letter *d* represents a portion of the side of the vessel hinged as a door, and having any suitable hook-and-eye or bolt fastenings for holding it closed. This door *d* affords more convenient access to the interior of the vessel *a* when planting the fruits, as hereinafter described. The perforations through which the fruit is grown are shown at *e*. The bottom *f* of vessel *a* has fixed to it centrally on the lower side any approved pintle, *g*, which takes its bearing in an apertured plate, *h*, set into the upper side or face of the bottom *i* of the water reservoir or vessel *k*, the sides or rim *j* of which may be formed with its bottom *i* or made separately of different material and attached to the bottom by any means affording a water-tight joint.

On the bottom of reservoir *k*, we arrange in any suitable bearings the casters or rollers *l*—three or more in number—and in position to support the vessel *a* near its periphery, and on which said vessel may rotate freely on its vertical axis and with minimum friction. If desired, the rollers *l* may be fixed to the vessel *a*, instead of to the reservoir *k*, and the pintle *g* may be fixed on the reservoir *k*, and the vessel *a* be fitted with a socket-piece or thimble fitting over the pintle and rotating thereon with the vessel *a*. We do not limit ourselves with respect to these details of construction. The vessel *a* may be rotated by grasping or pushing it bodily, but we provide handles *m*, for more conveniently turning it, and without damage to the fruit-clusters on the outside of the vessel.

The letter *n* represents a vase set on or over the open top of the vessel *a*. Said vase serves to hold flowers growing in earth filled in on top of the earth in vessel *a*, and this vase *n* may have any desired design to match or contrast with the shape of the fruit-vessel *a* below it, and so as to form an appropriate surmounting or finish to the whole. We provide a tube, *o*, perforated as at *p*, and having, preferably, a funnel-shaped top, *q*, which tube *o* is designed to be set centrally in vessel *a*, as in Fig. 2, and to act as a water-distributer to the plants throughout the whole height of the vessel, as will readily be understood.

The operation of our improved apparatus is as follows: Any suitable earth, *r*, preferably rich forest soil, is filled into vessel *a* up to about the first row of holes *e* from the bottom. The plants—such as strawberries *s*—are then set by their roots into the soil, and so as the fruit-bearing portions project through holes *e* all around the vessel *a*. Another layer of earth is then filled into the vessel *a* to the next higher row of holes *e* and a second row of plants set through these holes, and so on to the top of the vessel, the door *d* facilitating the setting of the lower layers of plants. The tube *o* will preferably be placed in position as the planting progresses, and when this work is finished the vase *n* may be applied and set with suitable flowers or shrubs, which may be trained loosely over the open top of pipe *o*, to conceal the pipe, while not preventing a pouring of water therein, which flows through perforations *p* to the earth *r*, for continuous water-supply to the plants, any surplus of water finding its way through perforations *f'* of bottom *f* to the reservoir *k*, to be afterward absorbed as required by the earth in the vessel.

It will be noted that the tapering shape of vessel *a* from bottom to top admits of a reception of the sun's rays by all the plants when the sun is at its meridian, and the provision for rotating the vessel on its vertical axis provides for bringing the plants, or any of them, to face a rising or declining sun, thereby facilitating the ripening of backward plants and the vigorous growth of all the plants.

It is also evident that a very large economy of space is secured by the use of our method and apparatus over the ordinary ways of cultivation; also that the plants are preserved clear of weeds, and that the ripened fruit may be picked easily, and will be free from the sand and grit usually found upon fruits grown directly in or on the ground.

Our improvements, furthermore, permit the cultivation of fruits by the poorer classes, and in crowded cities where ground-space for gardens is scarce or unknown.

Having thus described our invention, what we claim as new, and desire to secure by Letters Patent, is—

1. The combination, with the perforated vessel *a*, adapted to be filled with earth, of the centrally-disposed upright tube *o*, penetrating the earth to near the bottom of vessel *a*, and having a series of apertures, *p*, arranged at regular intervals along its length, said tube having a flared or funnel-shaped mouth, *q*, and the bottom reservoir, *k*, within which the vessel *a* is pivoted and arranged to rotate, substantially as and for the purpose set forth.

2. The perforated vessel *a*, adapted to be filled with earth, in combination with the vase *n*, removably superposed upon the said vessel, and the centrally-disposed upright tube, *o*, penetrating the earth to near the bottom of the vessel, and having a series of apertures, *p*, arranged at regular intervals along its length, said tube having a flared or funnel-shaped mouth, *q*, and the bottom reservoir, *k*, within which the vessel *a* is pivoted and arranged to rotate, substantially as and for the purpose set forth.

JOHN WILLIAM GROVES.
VALENTINE MINICH.

Witnesses:
WM. McNAIR,
V. SCHÖPPERLE.